US012794248B2

(12) United States Patent
Ji

(10) Patent No.: US 12,794,248 B2
(45) Date of Patent: Nov. 10, 2026

(54) POWER SUPPLYING SYSTEM FOR DYNAMICALLY CONTROLLING BATTERIES TO BE CONNECTED WITH EACH OTHER IN PARALLEL MANNER OR IN SERIAL MANNER BY SWITCH DEVICES

(71) Applicant: MEDIATEK INC., Hsin-Chu (TW)

(72) Inventor: Yan-Liang Ji, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 775 days.

(21) Appl. No.: 18/096,023

(22) Filed: Jan. 12, 2023

(65) Prior Publication Data

US 2023/0261484 A1 Aug. 17, 2023

Related U.S. Application Data

(60) Provisional application No. 63/311,110, filed on Feb. 17, 2022.

(51) Int. Cl.
*H02J 7/00* (2026.01)
*H02J 7/50* (2026.01)

(52) U.S. Cl.
CPC .............. *H02J 7/575* (2026.01); *H02J 7/855* (2026.01)

(58) Field of Classification Search
CPC ..................................................... H02J 7/0024
USPC ......................................................... 320/117
See application file for complete search history.

(56) References Cited

U.S. PATENT DOCUMENTS 10,298,028 B1 5/2019 Venkatasamy
2001/0038275 A1 11/2001 Hanada
2018/0166902 A1* 6/2018 Huang .................. H02M 3/158
2018/0372067 A1* 12/2018 Hoffmann ............... F03D 13/10
2019/0372067 A1 12/2019 Fieldbinder
(Continued)

FOREIGN PATENT DOCUMENTS

CN 103168406 A 6/2013
CN 103493332 A 1/2014
(Continued)

OTHER PUBLICATIONS

Search Report mailed/issued on Jun. 22, 2023 for EP application No. 23155050.0, pp. 1~8, The search result(s) can be found on p. 2 of the document.
(Continued)

*Primary Examiner* — Yalkew Fantu
(74) *Attorney, Agent, or Firm* — Winston Hsu

(57) ABSTRACT

A power supplying system for supplying power in an electronic device includes rechargeable batteries coupled to a functional block of the electronic device. The rechargeable batteries include a first battery and a second battery. In a normal mode, the first battery and the second battery are connected in parallel between a system voltage supplying node and a ground node, in a first state of a charging mode, the first battery and the second battery are connected in serial between a charge input node and the ground node with a first terminal of the second battery being connected to the system voltage supplying node, and in a second state of the charging mode, the first battery and the second battery are connected in serial between the charge input node and the ground node with a first terminal of the first battery being connected to the system voltage supplying node.

5 Claims, 6 Drawing Sheets

(56) References Cited

U.S. PATENT DOCUMENTS

| | | | | |
|---|---|---|---|---|
| 2021/0281085 | A1* | 9/2021 | Lee | H02J 7/007182 |
| 2022/0123564 | A1* | 4/2022 | Jia | H02J 7/0016 |

FOREIGN PATENT DOCUMENTS

| | | | |
|---|---|---|---|
| CN | 107947330 | | 4/2018 |
| CN | 108116350 | | 6/2018 |
| CN | 112600279 | A | 4/2021 |
| CN | 113746147 | | 12/2021 |
| CN | 113746147 | A | 12/2021 |
| CN | 113746148 | A | 12/2021 |
| EP | 2 688 179 | A1 | 1/2014 |
| TW | 523947 | | 3/2003 |
| TW | 202120353 | A | 6/2021 |
| TW | M613525 | U | 6/2021 |
| TW | 202127783 | A | 7/2021 |
| TW | 202135369 | A | 9/2021 |
| WO | 2021/020018 | A1 | 2/2021 |

OTHER PUBLICATIONS

Ji, the specification, including the claims, and drawings in the U.S. Appl. No. 18/096,018 , filed Jan. 12, 2023.

* cited by examiner

POWER SUPPLYING SYSTEM FOR DYNAMICALLY CONTROLLING BATTERIES TO BE CONNECTED WITH EACH OTHER IN PARALLEL MANNER OR IN SERIAL MANNER BY SWITCH DEVICES

CROSS REFERENCE TO RELATED APPLICATIONS

This application claims the benefit of U.S. Provisional Application No. 63/311,110, filed on Feb. 17, 2022. The content of the application is incorporated herein by reference.

BACKGROUND

Recently, there is dramatically growing demand for portable electronic products such as tablet computers, laptop computers, digital cameras, smart watches and mobile phones. For energy storage and power supply, rechargeable batteries are commonplace for powering a large variety of portable electronic products.

A battery pack is usually formed by combining a plurality of battery cells in series, in parallel, or in a mixed connection manner, and when recharging the battery, the charging power is applied to the entire battery pack, resulting in a relatively long charging time. In addition, in circumstances of a current battery manufacturing technology, battery cells may not have identical battery parameters during manufacturing, grouping, use, maintenance, and other activities. Therefore, when the plurality of battery cells are charged after being connected, it may be in a condition that not all the cells could be fully charged to achieve a same voltage. As a result, system performance of the entire battery pack is apt to degrade, and a system capacity and a cyclic life are also affected.

To improve the power supplying efficiency of the portable electronic products as well as the lifespan of the rechargeable batteries, a novel circuit design for a power supplying system is highly required.

SUMMARY

According to an embodiment of the invention, a power supplying system for supplying power in an electronic device comprises a plurality of rechargeable batteries coupled to a functional block of the electronic device. The rechargeable batteries at least comprise a first battery and a second battery. In a normal mode, the first battery and the second battery are connected in parallel between a system voltage supplying node and a ground node, in a first state of a charging mode, the first battery and the second battery are connected in serial between a charge input node and the ground node with a first terminal of the second battery being connected to the system voltage supplying node, and in a second state of the charging mode, the first battery and the second battery are connected in serial between the charge input node and the ground node with a first terminal of the first battery being connected to the system voltage supplying node.

According to another embodiment of the invention, a power supplying system for supplying power in an electronic device comprises a plurality of rechargeable batteries coupled to a functional block of the electronic device and a plurality of switch devices each being coupled to at least one of the rechargeable batteries. The rechargeable batteries at least comprise a first battery and a second battery. The switch devices dynamically switch connections of the first battery and the second battery between a charge input node and a ground node in a charging mode. In a first state of the charging mode, the first battery and the second battery are connected in serial between the charge input node and the ground node with a first terminal of the second battery being connected to a system voltage supplying node, and in a second state of the charging mode, the first battery and the second battery are connected in serial between the charge input node and the ground node with a first terminal of the first battery being connected to the system voltage supplying node.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
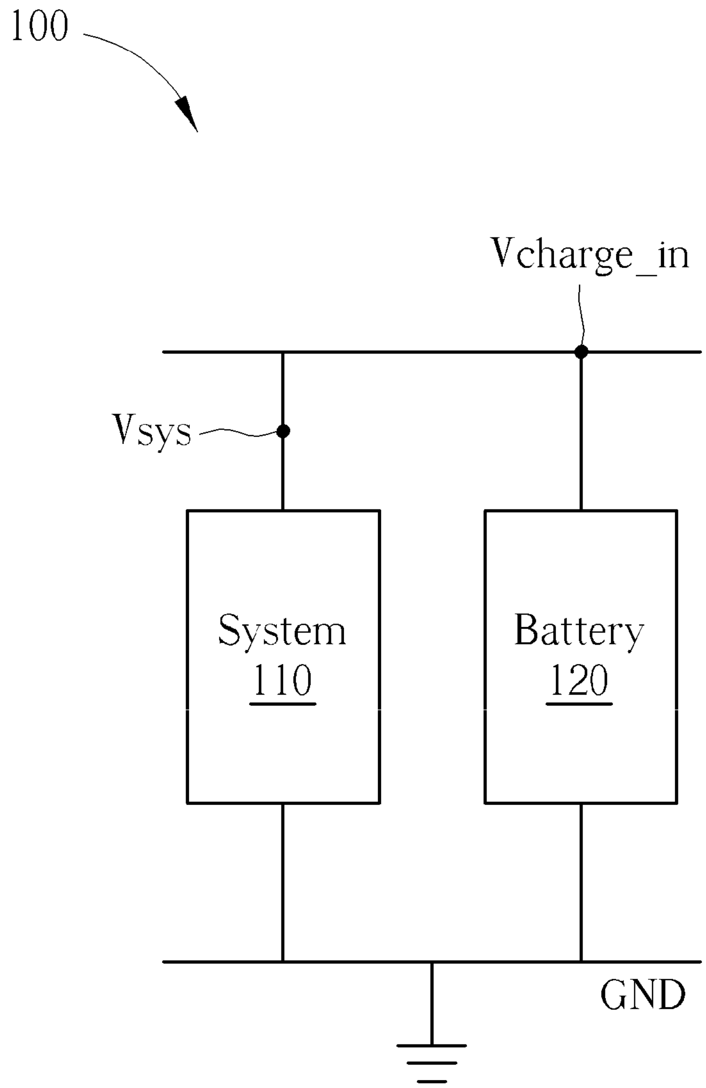
FIG. 1 shows a simplified block diagram of an electronic device with a power supplying system comprising a single battery.

FIG. 1 shows a simplified block diagram of an electronic device with a power supplying system comprising a single battery. The electronic device 100 may comprise at least one functional block 110 and a battery 120. The functional block 110 may be a representative of a plurality of hardware devices in the electronic device 100 that receive power from the battery 120. As an example, the functional block 110 may comprise a microprocessor, a memory device, a radio transceiver, one or more analog signal processing devices, one or more digital signal processing devices, a display device, a speaker device, and others. For being representative, the functional block 110 is labeled by "System" in FIG. 1.

In the power supplying system shown in FIG. 1, the battery 120 is configured to provide the functional block 110 (e.g. the system of electronic device 100) with power through the system voltage supplying node Vsys. In addition, the battery 120 may be a rechargeable battery and may be configured to receive the charging voltage or charging current from an external charger or an external power supplier, such as from any kind of voltage/current regulator, through a charge input node Vcharge_in.

One drawback of the single battery power supplying system is that the charging voltage/charging current provided by the external charger or the external power supplier is limited by the charging voltage/charging current of the battery 120.

Figure 2:
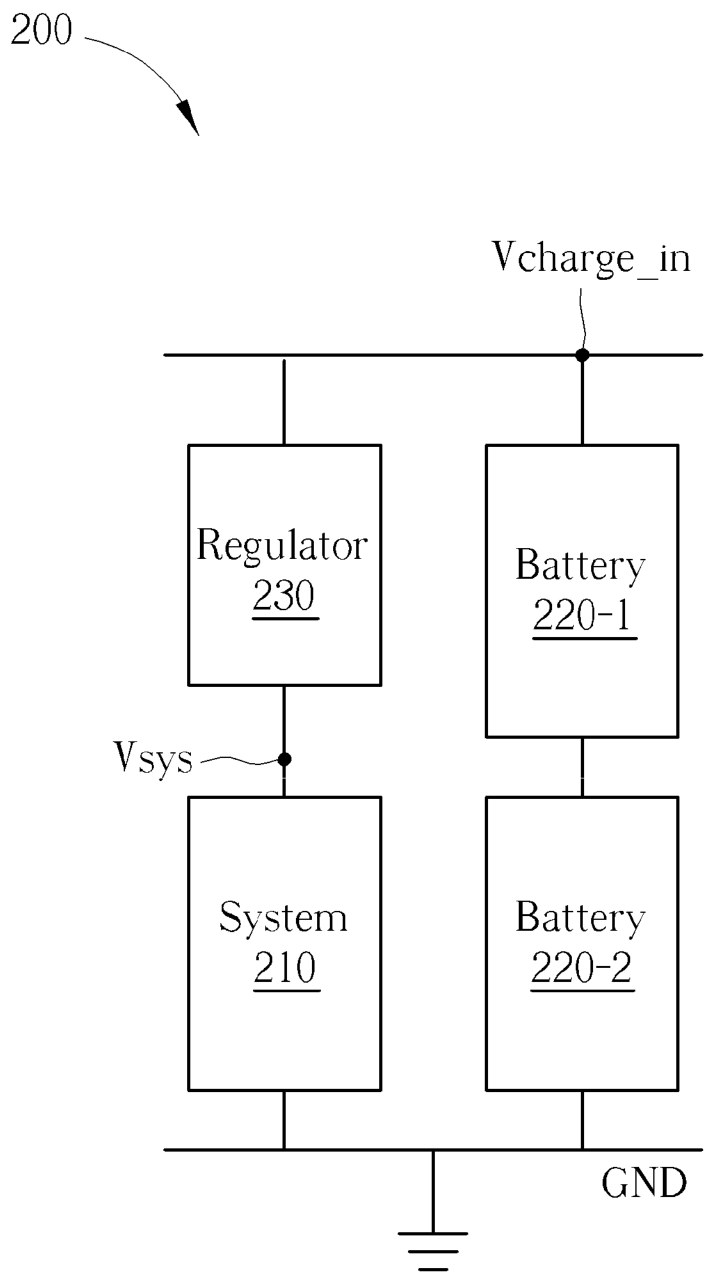
FIG. 2 shows another simplified block diagram of an electronic device with a power supplying system comprising multiple batteries.

FIG. 2 shows another simplified block diagram of an electronic device with a power supplying system comprising multiple batteries. The electronic device 200 may comprise at least one functional block 210 and two batteries 220-1 and 220-2 coupled in serial. Similarly, the functional block 210 may be a representative of a plurality of hardware devices in the electronic device 200 that receive power from the batteries 220-1 and 220-2. As an example, the functional block 210 may comprise a microprocessor, a memory device, a radio transceiver, one or more analog signal processing devices, one or more digital signal processing devices, a display device, a speaker device, and others. For being representative, the functional block 210 is labeled by "System" in FIG. 2.

In the power supplying system shown in FIG. 2, the batteries 220-1 and 220-2 are configured to provide the functional block 210 (e.g. the system of electronic device 200) with power through the system voltage supplying node Vsys. In addition, the batteries 220-1 and 220-2 may be rechargeable batteries and may be configured to receive the charging voltage or charging current from an external charger or an external power supplier, such as from any kind of voltage/current regulator, through the charge input node Vcharge_in.

Compared to the single battery power supplying system shown in FIG. 1, a higher supply voltage is generated when the batteries 220-1 and 220-2 are coupled in serial, therefore, when supplying the system with power, an internal regulator 230 is required in the power supplying system shown in FIG. 2 to regulate or generate the system voltage required by the functional block 210 based on the supply voltage provided by the batteries 220-1 and 220-2.

However, the regulator 230 is also a power consuming device. Therefore, although the charging voltage/charging current is increased so that the charging speed of power supplying system is increased by coupling the batteries 220-1 and 220-2 in serial, extra power consumption is generated as well due to the use of the regulator 230, which is a drawback of the serial battery power supplying system.

To improve both the power supplying efficiency and the charging speed of the rechargeable batteries in an electronic device as well as to achieved balanced battery utilization, novel circuit designs for a power supplying system are proposed.

Figure 3:
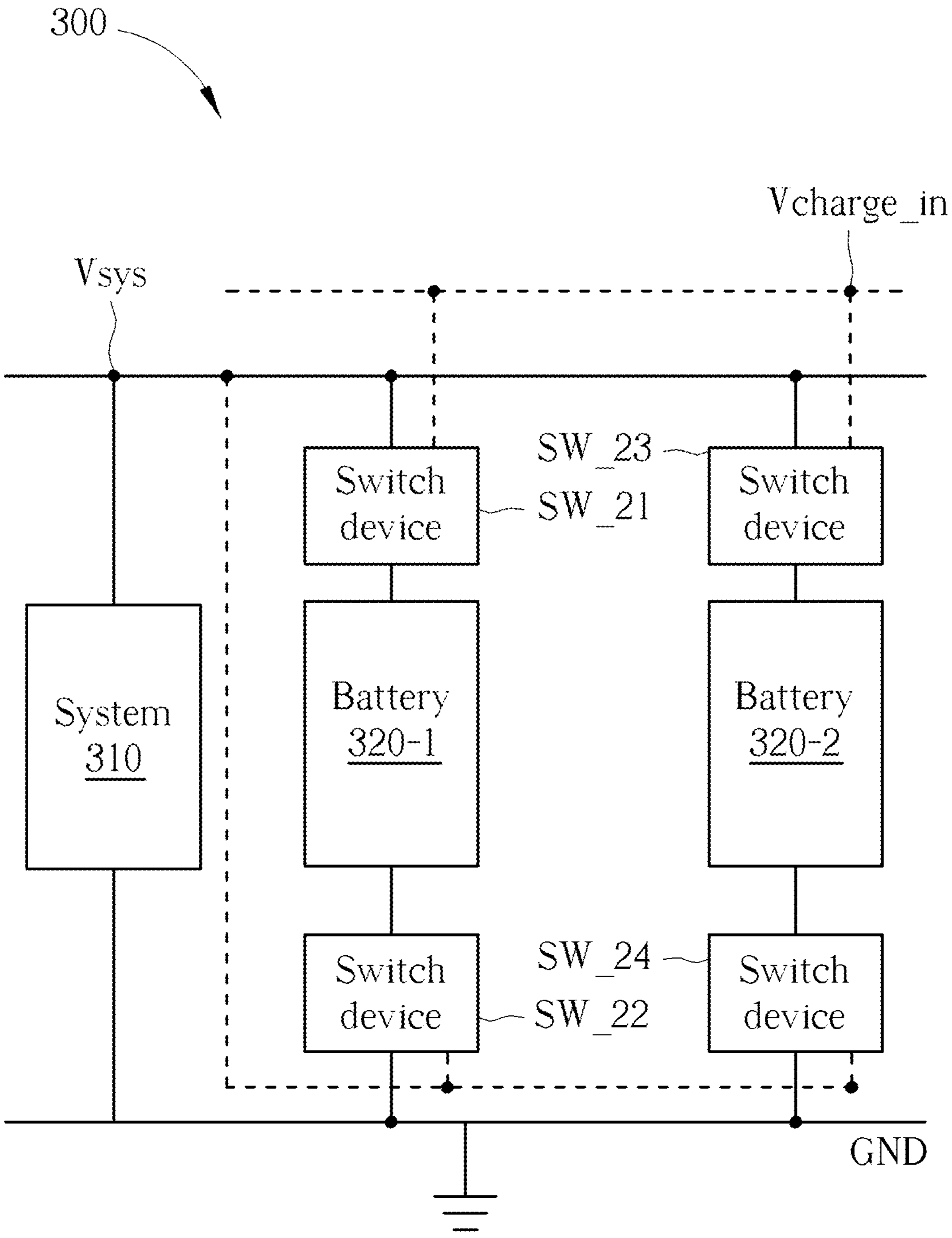
FIG. 3 is a schematic diagram showing a simplified block diagram of an electronic device with a power supplying system comprising multiple batteries according to an embodiment of the invention.

FIG. 3 is a schematic diagram showing a simplified block diagram of an electronic device with a power supplying system comprising multiple batteries for supplying power in the electronic device according to an embodiment of the invention. The electronic device 300 may comprise at least one functional block 310 and two batteries 320-1 and 320-2. The functional block 310 may be a huge functional block and may be a representative of a plurality of hardware devices in the electronic device 300 that receive power from the batteries 320-1 and 320-2. As an example, the functional block 310 may comprise a microprocessor, a memory device, a radio transceiver, one or more analog signal processing devices, one or more digital signal processing devices, a display device, a speaker device, and others. For being representative, the functional block 310 is labeled by "System" in FIG. 3.

According to an embodiment of the invention, the batteries 320-1 and 320-2 may be rechargeable batteries and may be configured to receive the charging voltage or charging current from an external charger or an external power supplier, such as from any kind of voltage/current regulator, through the charge input node Vcharge_in. Note that in the embodiments of the invention, the batteries 320-1 and 320-2 may respectively be a battery pack formed by combining a plurality of battery cells in series, in parallel, or in a mixed connection manner, and the invention is not limited to any specific way of implementation or any specific of number of batteries or battery cells.

In the embodiments of the invention, besides the batteries 320-1 and 320-2, the power supplying system for supplying power in the electronic device 300 further comprise a plurality of switch devices. By configuring the switch devices, the batteries 320-1 and 320-2 may be controlled to be flexibly connected with each other in a parallel manner or in a serial manner. As an example, in an embodiment of the invention, in a normal mode for providing the functional block 310 (e.g. the system of electronic device 300) with power, the batteries 320-1 and 320-2 may be connected in parallel between the system voltage supplying node Vsys and the ground node GND, while in a charging mode, the batteries 320-1 and 320-2 may be connected in serial between the charge input node Vcharge_in and the ground node GND for receiving charging voltage or charging current from the external charger or the external power supplier. In this manner, no internal regulator, which will consume extra power, is required, and the power supplying efficiency is improved. In addition, in this manner, the charging speed of the rechargeable batteries is increased as well and a fast charging behavior is achieved.

Moreover, in the embodiments of the invention, in the charging mode, by configuring the switch devices, the connections of the first battery and the second battery between the charge input node Vcharge_in and the ground node GND may further be dynamically switched. As an example, in an embodiment of the invention, in a first state of the charging mode, the batteries 320-1 and 320-2 are connected in serial between the charge input node Vcharge_in and the ground node GND with a first terminal of the battery 320-2 being connected to the system voltage supplying node Vsys, and in a second state of the charging mode, the batteries 320-1 and 320-2 are connected in serial between the charge input node Vcharge_in and the ground node GND with a first terminal of the battery 320-1 being connected to the system voltage supplying node Vsys. In this manner, the high charging voltage may be applied to batteries 320-1 and 320-2 by turns, and more balanced battery utilization and more balanced battery degradation speed are achieved.

According to an embodiment of the invention, each of the switch devices in the power supplying system is coupled to at least one of the batteries 320-1 and 320-2, for dynamically controlling the connections of the batteries 320-1 and 320-2 as described above. In addition, the functional block 310 may further comprise a power management device configured to control the on (e.g. closed) or off (e.g. opened) status of the switch devices, so as to flexibly and dynamically control the connections of the batteries 320-1 and 320-2. Note that in some embodiments, the control of the switch devices may also be implemented by the aforementioned microprocessor, or, the power management device may be a circuit subunit of the microprocessor, and the invention is not limited to any specific way of implementation.

In an embodiment of the invention, the plurality of switch devices may comprise switch devices SW_21, SW_22, SW_23 and SW_24. The switch device SW_21 is coupled between the charge input node Vcharge_in and a first terminal of the battery 320-1. The switch device SW_22 is coupled between a second terminal of the battery 320-1 and the ground node. The switch device SW_23 is coupled between the charge input node Vcharge_in and a first terminal of the battery 320-2. The switch device SW_24 is coupled between a second terminal of the battery 320-2 and the ground node GND. According to an embodiment of the invention, the first terminal of a battery may be a positive terminal for connecting to a node with relative high voltage and the second terminal of the battery may be a negative terminal for connecting to a node with relative low voltage.

In addition, in the embodiments of the invention, the switch device SW_21 may be further coupled to the system voltage supplying node Vsys and is configured to selectively connect the first terminal of the battery 320-1 to the charge input node Vcharge_in or the system voltage supplying node Vsys and the switch device SW_22 may be further coupled to the system voltage supplying node Vsys and is configured to selectively connect the second terminal of the battery 320-1 to the system voltage supplying node Vsys or the ground node GND. Similarly, in the embodiments of the invention, the switch device SW_23 may be further coupled to the system voltage supplying node Vsys and is configured to selectively connect the first terminal of the battery 320-2 to the charge input node Vcharge_in or the system voltage supplying node Vsys and the switch device SW_24 may be further coupled to the system voltage supplying node Vsys and is configured to selectively connect the second terminal of the battery 320-2 to the system voltage supplying node Vsys or the ground node GND.

According to an embodiment of the invention, one or more of the switch devices SW_21, SW_22, SW_23 and SW_24 may respectively be a single pole double throw (SPDT) switch device, and may comprise three connection nodes.

Figure 4:
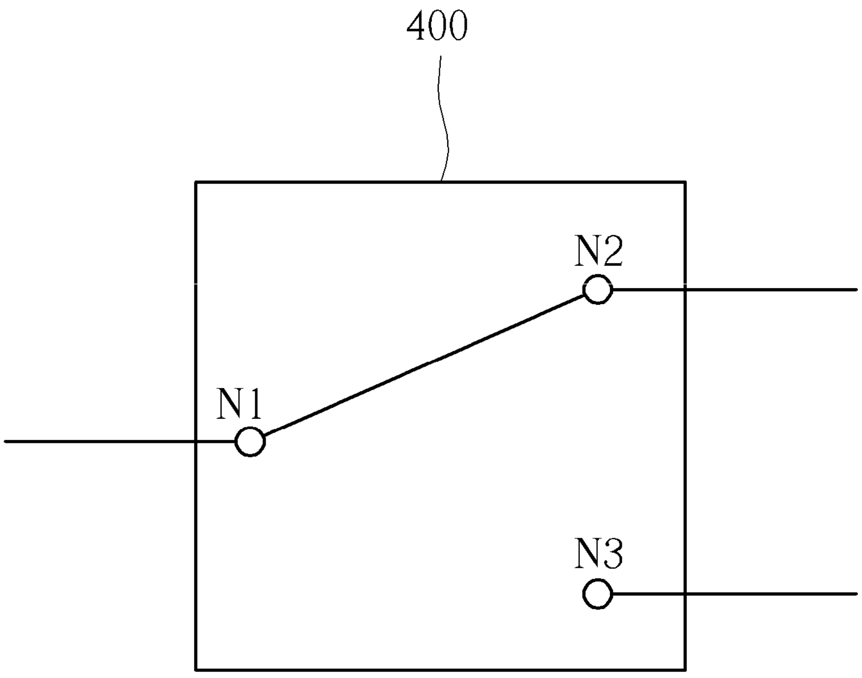
FIG. 4 is a schematic diagram of a SPDT switch device according to an embodiment of the invention.

FIG. 4 is a schematic diagram of a SPDT switch device according to an embodiment of the invention. The switch device 400 may comprise three connection nodes N1, N2 and N3. The switch device 400 may be configured to selectively connect the connection node N1 to the connection node N2 or the connection node N3. When switch device 400 is implemented as the switch device SW_21 shows in FIG. 3, the connection node N1 may be connected to the first terminal of the battery 320-1, the connection node N2 may be connected to the system voltage supplying node Vsys, and the connection node N3 may be connected to the charge input node Vcharge_in. When switch device 400 is implemented as the switch device SW_22 shows in FIG. 3, the connection node N1 may be connected to the second terminal of the battery 320-1, the connection node N2 may be connected to the system voltage supplying node Vsys, and the connection node N3 may be connected to the ground node GND. When switch device 400 is implemented as the switch device SW_23 shows in FIG. 3, the connection node N1 may be connected to the first terminal of the battery 320-2, the connection node N2 may be connected to the system voltage supplying node Vsys, and the connection node N3 may be connected to the charge input node Vcharge_in. When switch device 400 is implemented as the switch device SW_24 shows in FIG. 3, the connection node N1 may be connected to the second terminal of the battery 320-2, the connection node N2 may be connected to the system voltage supplying node Vsys, and the connection node N3 may be connected to the ground node GND.

Note that the SPDT switch device is one of a variety of possible implementations of the switch device, and the invention should not be limited thereto.

As an example, in another implementation, the switch device SW_22 and/or SW_24 may be configured to provide two connection paths, one for connecting a terminal of the corresponding battery to the system voltage supplying node Vsys and the other for connecting the terminal of the corresponding battery to the ground node GND, and the switch device is configured to respectively control the on (e.g. closed or conducted) or off (e.g. opened) status of the two connection paths. When the connection path between the terminal of the corresponding battery and the ground node GND is opened for disconnecting the corresponding battery from the ground node GND, the connection path between the terminal of the corresponding battery and the system voltage supplying node Vsys is closed (e.g. conducted) for connecting the corresponding battery to the system voltage supplying node Vsys, and vice versa. In this manner, the switch devices may have two switching statuses, wherein in a first switching status, the corresponding battery is connected to the system voltage supplying node Vsys and is disconnected from the ground node GND, while in a second switching status, the corresponding battery is connected to the ground node GND and is disconnected from the system voltage supplying node Vsys.

Likewise, the switch device SW_21 and/or SW_23 may be configured to provide two connection paths, one for connecting a terminal of the corresponding battery to the charge input node Vcharge_in and the other for connecting the terminal of the corresponding battery to the system voltage supplying node Vsys, and the switch device is configured to respectively control the on (e.g. closed or conducted) or off (e.g. opened) status of the two connection paths. When the connection path between the terminal of the corresponding battery and the charge input node Vcharge_in is opened for disconnecting the corresponding battery from the charge input node Vcharge_in, the connection path between the terminal of the corresponding battery and the system voltage supplying node Vsys is closed for connecting the corresponding battery to the system voltage supplying node Vsys, and vice versa. In this manner, the switch devices may have two switching statuses, wherein in a first switching status, the corresponding battery is connected to the charge input node Vcharge_in and is disconnected from the system voltage supplying node Vsys, while in a second switching status, the corresponding battery is connected to the system voltage supplying node Vsys and is disconnected from the charge input node Vcharge_in.

Note that the control of the on (e.g. closed) or off (e.g. opened) status of the switch devices may comprise the control the on (e.g. closed or conducted) or off (e.g. opened) status of the two connection paths and/or the aforementioned switching statuses. As an example, when the connection path between the connection node N1 and the connection node N2 is opened, the connection path between the connection node N1 and the connection node N3 is closed, and vice versa.

Referring back to FIG. 3, FIG. 3 shows the exemplary connections in the power supplying system when the electronic device 300 is operating in the normal mode. In the normal mode, the switch device SW_21 is controlled to be in the second switching status to connect the first terminal of the battery 320-1 to the system voltage supplying node Vsys, the switch device SW_22 is controlled to be in the second switching status to connect the second terminal of the battery 320-1 to the ground node GND, the switch device SW_23 is controlled to be in the second switching status to connect the first terminal of the battery 320-2 to the system voltage supplying node Vsys and the switch device SW_24 is controlled to be in the second switching status to connect the second terminal of the battery 320-2 to the ground node GND.

Note that in the embodiments where the switches SW_21, SW_22, SW_23 and SW_24 are implemented by or comprise one or more transistors, in the normal mode, the transistors on the conducted connection path may be controlled to be fully or partially turned on, so as to respectively conduct a power supplying path from the batteries 320-1 and 320-2 to the functional block 310 for supplying power. Note further that the transistors may also play the role to regulate both the voltage at the system voltage supplying node Vsys and the voltages provided by the batteries 320-1 and 320-2.

Figure 5:
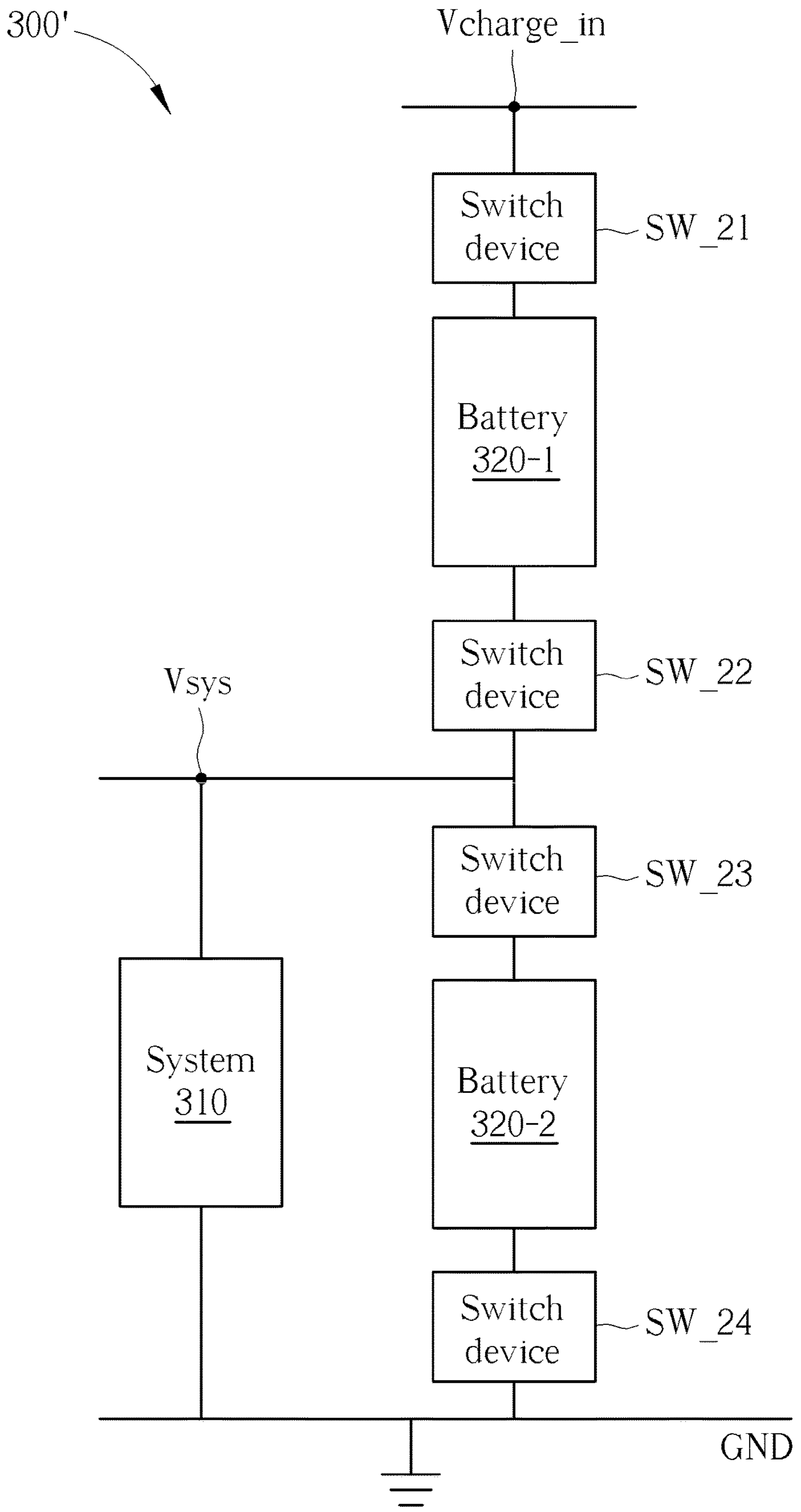
FIG. 5 is a schematic diagram showing a simplified block diagram of an electronic device with a power supplying system comprising multiple batteries for supplying power in the electronic device according to another embodiment of the invention.

FIG. 5 is a schematic diagram showing a simplified block diagram of an electronic device with a power supplying system comprising multiple batteries for supplying power in the electronic device according to another embodiment of the invention. FIG. 5 shows the exemplary connections in the power supplying system when the electronic device as shown in FIG. 3 is operating in the first state of the charging mode. Note that, the same or like reference numbers refer to the same features described above regarding FIG. 3, and repeated descriptions are omitted here for brevity.

In the first state of the charging mode of the electronic device, such as the electronic device 300' shown in FIG. 5, the switch device SW_21 is controlled to be in the first switching status to connect the first terminal of the battery 320-1 to the charge input node Vcharge_in, the switch device SW_22 is controlled to be in the first switching status to connect the second terminal of the battery 320-1 to the system voltage supplying node Vsys, the switch device SW_23 is controlled to be in the second switching status to connect the first terminal of the battery 320-2 to the system voltage supplying node Vsys and the switch device SW_24 is controlled to be in the second switching status to connect the second terminal of the battery 320-2 to the ground node GND.

Figure 6:
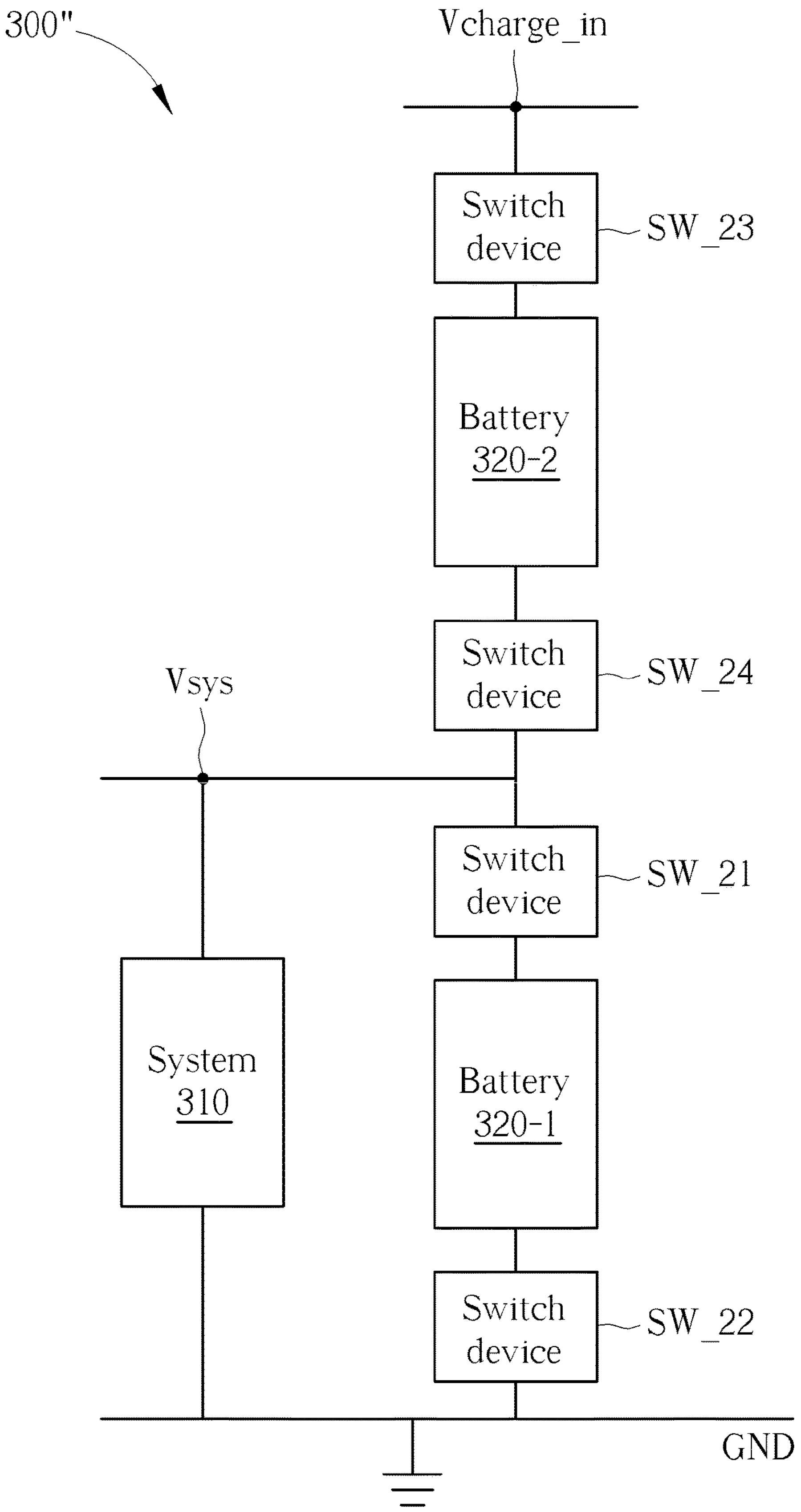
FIG. 6 is a schematic diagram showing a simplified block diagram of an electronic device with a power supplying system comprising multiple batteries for supplying power in the electronic device according to yet another embodiment of the invention.

FIG. 6 is a schematic diagram showing a simplified block diagram of an electronic device with a power supplying system comprising multiple batteries for supplying power in the electronic device according to yet another embodiment of the invention. FIG. 6 shows the exemplary connections in the power supplying system when the electronic device as shown in FIG. 3 is operating in the second state of the charging mode. Note that, the same or like reference numbers refer to the same features described above regarding FIG. 3, and repeated descriptions are omitted here for brevity.

In the second state of the charging mode of the electronic device, such as the electronic device 300" shown in FIG. 6, the switch device SW_21 is controlled to be in the second switching status to connect the first terminal of the battery 320-1 to the system voltage supplying node Vsys, the switch device SW_22 is controlled to be in the second switching status to connect the second terminal of the battery 320-1 to the ground node GND, the switch device SW_23 is controlled to be in the first switching status to connect the first terminal of the battery 320-2 to the charge input node Vcharge_in and the switch device SW_24 is controlled to be in the first switching status to connect the second terminal of the battery 320-2 to the system voltage supplying node Vsys.

As discussed above, the on (e.g. closed) or off (e.g. opened) status and/or the first switching status and the second switching status of the switch devices may be controlled by a power management device based on the current charging or power supplying requirements of the electronic device. In addition, by configuring the switch devices for regulating the voltages at different nodes, the power supplying system is capable of making the batteries being charged through the charge input node Vcharge_in while supplying power through the system voltage supplying node Vsys at the same time.

In addition, based on the proposed circuit design for the power supplying system, flexible connections of the batteries 320-1 and 320-2 are achieved. That is, in a normal mode for providing the functional block 310 with power, the batteries 320-1 and 320-2 are connected in parallel. Thus no internal regulator (such as the regulator 230 shown in FIG. 2) is required, and no extra power is consumed by the regulator. While in a charging mode, the batteries 320-1 and 320-2 are connected in serial to accomplish a fast charging behavior since based on the circuit structure with the batteries being connected in serial, a higher charging voltage can be applied and the charging speed can be increased. In this manner, the power supplying system with fast charging capability (e.g. as compared to the system shown in FIG. 1) and low power consumption (e.g. as compared to the system shown in FIG. 2) is achieved.

In addition, in the charging mode, the high charging voltage is applied to batteries 320-1 and 320-2 by turns. Therefore, more balanced battery utilization and more balanced battery degradation speed are achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power supplying system, for supplying power in an electronic device, comprising:

a plurality of rechargeable batteries, coupled to a functional block of the electronic device, wherein the plurality of rechargeable batteries at least comprise a first battery and a second battery; and a plurality of switch devices, each being coupled to at least one of the plurality of rechargeable batteries, for dynamically controlling the first battery and the second battery to be connected with each other in a parallel manner or in a serial manner;

wherein in a normal mode, the first battery and the second battery are connected in parallel between a system voltage supplying node and a ground node, in a first state of a charging mode, the first battery and the second battery are connected in serial between a charge input node and the ground node with a first terminal of the second battery being connected to the system voltage supplying node, and in a second state of the charging mode, the first battery and the second battery are connected in serial between the charge input node and the ground node with a first terminal of the first battery being connected to the system voltage supplying node;

wherein the plurality of switch devices comprise:

a first switch device, coupled between the charge input node and the first terminal of the first battery;

a second switch device, coupled between a second terminal of the first battery and the ground node a third switch device, coupled between the charge input node and the first terminal of the second battery; and a fourth switch device, coupled between a second terminal of the second battery and the ground node;

wherein in each of the normal mode and the charging mode, each of the first switch device, the second switch device, the third switch device, and the fourth switch device is further arranged to regulate a voltage at the system voltage supply node and voltages provided by the first battery and the second battery.

2. The power supplying system of claim 1, wherein the first switch device is further coupled to the system voltage supplying node and is configured to selectively connect the first terminal of the first battery to the charge input node or the system voltage supplying node, and the second switch device is further coupled to the system voltage supplying node and is configured to selectively connect the second terminal of the first battery to the system voltage supplying node or the ground node.

3. The power supplying system of claim 2, wherein in the normal mode, the first switch device connects the first terminal of the first battery to the system voltage supplying node and the second switch device connects the second terminal of the first battery to the ground node, in the first state of the charging mode, the first switch device connects the first terminal of the first battery to the charge input node and the second switch device connects the second terminal of the first battery to the system voltage supplying node, and in the second state of the charging mode, the first switch device connects the first terminal of the first battery to the system voltage supplying node and the second switch device connects the second terminal of the first battery to the ground node.

4. The power supplying system of claim 1, wherein the third switch device is further coupled to the system voltage supplying node and is configured to selectively connect the first terminal of the second battery to the charge input node or the system voltage supplying node, and the fourth switch device is further coupled to the system voltage supplying node and is configured to selectively connect the second terminal of the second battery to the system voltage supplying node or the ground node.

5. The power supplying system of claim 4, wherein in the normal mode, the third switch device connects the first terminal of the second battery to the system voltage supplying node and the fourth switch device connects the second terminal of the second battery to the ground node, in the first state of the system voltage supplying node, the third switch device connects the first terminal of the second battery to the system voltage supplying node and the fourth switch device connects the second terminal of the second battery to the ground node, and in the second state of the charging mode, the third switch device connects the first terminal of the second battery to the charge input node and the fourth switch device connects the second terminal of the second battery to the system voltage supplying node.

* * * * *